Jan. 28, 1936.  W. B. GREEN  2,029,164
ROLLING MILL DRIVE
Filed Oct. 27, 1931

Inventor:
Wilfred B. Green,
by Charles E. Tullar
His Attorney.

Patented Jan. 28, 1936

2,029,164

UNITED STATES PATENT OFFICE 2,029,164

ROLLING MILL DRIVE

Wilfred B. Green, Rugby, England, assignor to General Electric Company, a corporation of New York Application October 27, 1931, Serial No. 571,407
In Great Britain October 29, 1930

7 Claims. (Cl. 242—75)

This invention relates to rolling mill drives and more particularly to rolling mills of the so-called traction type which are used for the cold rolling of strip metal. Such mills usually consist of two drums, one mounted on each side of a pair of reducing rolls and the strip which is coiled on one of the drums is pulled through the rolls by the other drum on which it is wound, the passage through the rolls reducing its section. When the whole of the strip has been transferred from one drum to the other, the rotation of the drums is reversed, and the strip fed back, a further reduction of its cross section taking place.

The object of this invention is to provide an improved drive for such rolling mills in which the pull exerted on the strip may be kept approximately constant and the braking force exerted will be practically uniform independently of any variations in the effective diameter of the drum caused by the winding on or off of the strip. The invention has for a further object to provide means whereby the driving motors may be run at a low speed.

In carrying this invention into effect, two dynamoelectric machines are provided with fields of different strength, the difference in strength being preferably obtained by employing compound windings which may be connected to act cumulatively or differentially. The machines are connected to a common source of supply, so as to tend to drive them in opposite directions and they are also connected together mechanically to rotate in the same direction. The mechanical connection preferably comprises the strip metal passing between the rolls of the mill and which is wound on drums in driving connection with the machines. The more powerful machine is thus arranged to drive and to be braked by the other machine.

Figure 1:
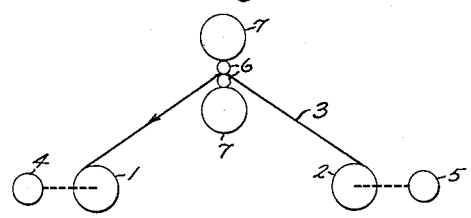
Figure 2:
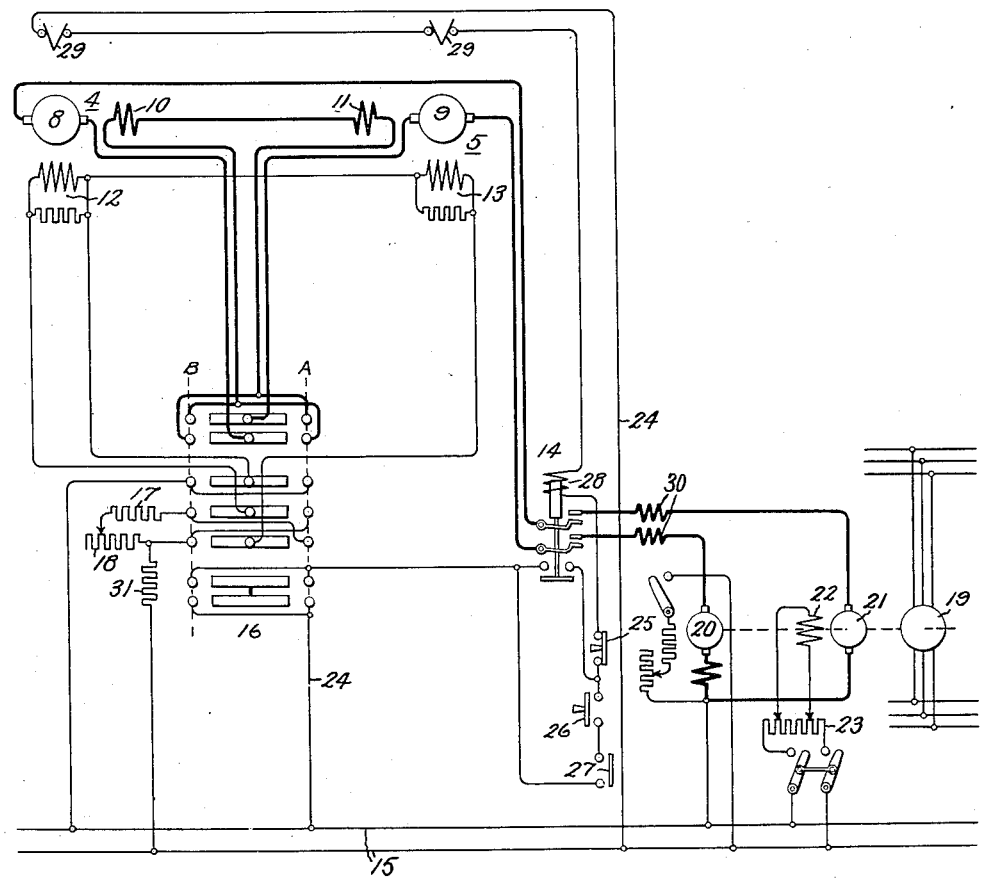

The invention in its preferred form will now be described with reference to the accompanying drawing in which Fig. 1 indicates the system employed and Fig. 2 is a circuit diagram showing the connections for the motor field and armature circuits with the preferred arrangement and method of supply.

In Fig. 1, drums 1 and 2 carrying strip metal 3 are driven by motors 4 and 5 respectively. The strip passes between working rolls 6 which lie between backing rolls 7. When the strip is travelling in the direction indicated by the arrow, the motor 4 is the driving motor while 5 acts as a regenerative braking device.

Referring now to Fig. 2, motors 4 and 5 have armatures 8 and 9, series field windings 10 and 11, and separately excited field windings 12 and 13 respectively. The supply arrangement hereinafter described has a main output connected to the armatures through the circuit-breaker 14 and a separate direct current output 15 which supplies the field windings 12 and 13 and the other circuits. A reversing controller 16 connects the field windings of motor 4 to act cumulatively and windings of motor 5 to act differentially when motor 4 is driving the drum and pulling the strip as indicated in Fig. 1. When motor 5 drives drum 2 connections are made to produce opposite effects. In either case the fields are so connected that the motors tend to rotate in opposite directions.

When motor 4 is the pulling motor, the controller is placed in position A. This completes the armature circuit through the series field windings 10 and 11. Winding 12 is fully excited by connection across supply 15 while winding 13 is excited by connection through resistances 17 and 18 to the supply 15. The circuit for the separately excited field winding 12 extends from the upper side of the supply source 15 through the third (from the top) right hand finger and cooperating segment of the master switch 16, field winding 12 from right to left, fourth segment and cooperating finger of the master switch and resistance 31 to the lower side of the supply source. The circuit for the separately excited field winding 13 of motor 5 is traced from the upper side of the supply source 15 to the right hand terminal of field winding 12 as before, thence through the field winding 13 from left to right, fifth segment of master switch 16 and cooperating finger, resistances 17, 18 and 31 in series to the lower side of the supply source. Current flows through the armature from the upper terminal (assumed to be positive) of generator 20 through lower contact of circuit breaker 14 in the closed position thereof, armature 9 of motor 5, upper segment of master switch and cooperating finger, through series field winding 11 from right to left so that the magnetism of windings 5 and 11 act differentially with respect to each other, through field winding 10 from right to left so that its magnetism acts cumulatively with the magnetism of winding 12, second finger and segment of master switch, armature 8 of motor 4 and thence through the upper contact of circuit breaker 14 and generator 21 to the negative terminal of generator 20. The cumulative action of field windings 10 and 12 produce a strong field in motor 4 and the differential action of field windings 11 and 13 produce a weak field in motor 5. By adjusting the resistance 18 the strength of the weak field may be varied. Motor 4 now drives its drum 1 which unwinds strip metal from drum 2. The motor 5 is thus rotated and acts as a generator to return power to the system and to produce the braking effect.

The voltage across motor 5 will depend on the degree of its excitation and the voltage across motor 4 will be the sum of the supply voltage and the voltage of motor 5, neglecting voltage drop in the connections. Motor 4 will run at approximately constant speed but the speed of motor 5 will depend on the relative diameters of the drums which will vary as the strip is wound from one drum to the other. Thus the torque of motor 4 will increase as the diameter of drum 1 increases, and hence the current in the armature circuits will also increase. The braking pull exerted by motor 5 will depend partly on its armature current, partly on its field excitation, and partly on the diameter of drum 2. As stated, the armature current increases as the diameter of drum 1 increases. At the same time, the diameter of drum 2 decreases. The effect of increased armature current is to increase the torque exerted by motor 5, thus causing a greater pull in the strip and this pull will be still further increased due to reduction in diameter of drum 2. It is desirable that the pull in the strip should be kept approximately constant, and this is effected by suitably proportioning the differentially connected series field 11 on the braking motor 5 in relation to the winding 13.

From the foregoing description of the circuit, it will be seen that the armatures 8 and 9 and series field windings 10 and 11 of the reel motors 4 and 5, respectively, are connected in series relationship with each other and supplied from a common source. Thus, in operation, as the diameter of the roll on the winding reel increases, the load on the winding reel motor will tend to increase and thereby increase the armature current. Since the field windings of the winding reel motor act cumulatively, an increase in the armature current tends to increase the torque of the motor and the tension in the strip. However, since the armature current also flows through the armature and series field windings of the unwinding reel machine (operating as a generator), and since the series field winding of the unwinding reel machine acts differentially, the torque of this machine is correspondingly decreased. This decreased torque of the unwinding reel machine lessens the tension in the strip and offsets the tendency to increase the tension produced by the winding reel motor and the continuously changing reel diameters.

Thus as the armature current of the braking motor increases, its total excitation is decreased so that the pull on the strip is kept approximately constant.

When it is desired to reverse the direction of travel of the strip 3, the controller 16 is moved to position B. This reverses the direction of current through the series fields 10 and 11 and at the same time connects the shunt field 13 directly across the supply 15 and the field 12 across this output but with resistances 17 and 18 inserted. As a result of the reversal of the direction of current through the series field windings 10 and 11, the field windings 10 and 12 now act differentially to produce a weak field in motor 4 and the field windings 11 and 13 act cumulatively to produce a strong field in motor 5. The motor 5 now becomes the driving motor and the strip is given an approximately constant braking pull by the regenerative action of the motor 4.

With rolling mills of this type it is desirable that the driving motor may be run at a low speed, say about 5% of the normal full speed. To enable this to be done satisfactorily the motors are supplied with current from a motor generator set consisting of a motor 19 driving two generators which have their armatures 20 and 21 connected in series. The generator 20 is a flat compounded shunt excited generator and operates at constant voltage. As shown in Fig. 2 it supplies the direct current line 15. Generator 21 has its field 22 excited from the line 15 through a potentiometer-connected rheostat 23 as shown, so that it is possible to vary its voltage up to the normal voltage of generator 20 in either direction, thus making it buck or boost generator 20 to obtain a voltage range from zero up to twice the voltage of generator 20. With such an arrangement when the combined voltage of the two generators is at a low value, that is, when the two motors are running at a slow speed, the generators are both nearly fully excited and are bucking each other. A varying load or armature current will therefore have a comparatively small effect on the total voltage developed by the combination and stable operation will be obtained. This condition could not be obtained with a single generator as with low speeds of the motors, the generator would have a low voltage and weak excitation and changes in the armature current would have a large effect upon its voltage resulting in unstable operation.

The remaining elements shown in the diagram are chiefly practical details and comprise the circuit 24, which includes "stop" and "start" switches 25 and 26, interlock 27 on the rheostat, and the lower contactors of the controller; also circuit-breaker winding 28 and excess speed devices 29. 30 indicates over-load trip devices in the motor circuit, while 31 is a small adjusting resistance common to both shunt field circuits.

What I claim as new and desire to secure by Letters Patent of the United States, is:

1. In combination with means for winding and unwinding a continuous strip of material having a winding reel and an unwinding reel, a pair of dynamo-electric machines each connected to one of said reels, and each provided with a series field winding and a parallel field winding, a supply generator, said generator and dynamo electric machines being connected in series relationship with each other, means for controlling the energization of said field winding so that the windings of the winding reel machine act cumulatively and the windings of the unwinding reel machine act differentially thereby to maintain the tension of the strip substantially constant and means for controlling said dynamo electric machines so that the voltage of one of said machines adds to the generator voltage and the voltage of the other of said machines opposes the generator voltage.

2. The combination with means for winding and unwinding a continuous strip of material having a winding reel and unwinding reel, comprising a supply generator, a pair of dynamo-electric machines each connected to one of said reels and having their armatures connected in series relationship with each other and with said generator, each of said dynamo electric machines being provided with a series field winding and a parallel field winding, and means for controlling the energization of said field windings so that the field windings of the winding reel machine act cumulatively and the field windings of the unwinding reel machine act differentially thereby to maintain the tension of the strip substantially constant.

3. The combination with apparatus for winding and unwinding a strip of material having winding and unwinding reels comprising a supply generator, a pair of dynamo-electric machines connected in series relationship with each other and said generator and each provided with a series field winding and a separately excited field winding, means for controlling the energization of said windings so that the voltage of the unwinding reel machine adds to that of said generator in supplying the winding reel machine, and connections for said field windings such that the field windings of the winding reel machine act cumulatively and the windings of said unwinding reel machine act differentially.

4. In combination with apparatus for winding and unwinding a strip of material having winding and unwinding reels, a source of supply, a pair of electric motors connected in series relationship with each other to said source and each connected to one of said reels, each of said motors being provided with a series field winding and a separately excited field winding, means for controlling the energization of said field windings so that the generated voltage of the unwinding reel motor adds to the source voltage to drive the winding reel motor, connections for said field windings such that the field windings of the winding reel motor act cumulatively and the windings of the unwinding reel motor act differentially, and a controller for reversing said connections so as to reverse the operation of said motors.

5. In combination with means for winding and unwinding a strip of material, a pair of reels adapted to serve alternately as winding and unwinding reels, a pair of motors each connected to one of said reels and each provided with series and separately excited field windings, a common source of supply for the armatures and series windings of said motors, connections from said source to said armatures and series field windings such that the motors are connected in series relationship and tend to rotate said reels to pull the strip in opposite directions, a master switching device for controlling the direction of the flow of current in said series windings so that the windings of one of said motors act cumulatively and the windings of the other of said motors act differentially and for reversing the direction of current flow in said series field windings while maintaining the same direction of current flow in said separately excited field windings whereby either motor may overhaul the other by winding strip from one reel to the other, and means controlled by said switching devices for varying the voltage applied to said separately excited windings.

6. In combination, means for winding and unwinding a continuous strip of material including a pair of dynamo-electric machines each having a series and a separately excited field winding, means for controlling the field connections of one of said machines so that the field windings act cumulatively to produce a strong field and for controlling the field connections of the other machine so that the field windings act differentially to produce a relatively weak field, a common source of electric supply for said machines, connections from said source to said machines tending to cause said machine to pull on the strip in opposite directions, said source comprising two generators, and means for causing one of said generators to buck the other generator under certain operating conditions and to boost said other generator under certain other operating conditions, said machines being mechanically connected to the strip so that one machine drives the other machine and is braked by the regenerative effect produced in said other machine.

7. In combination, means for winding and unwinding a continuous strip of material, a rolling mill comprising a pair of motors each having a series field winding and separately excited field winding, means establishing cumulative connections of the field windings of one of said machines and differential connections for the field windings of the other of said machines and for reversing said connections, a common source of supply for said motors, connections tending to drive said motors in opposite directions, said source comprising two generators, means for causing one of said generators to boost the other under certain operating conditions and to buck said other under certain other operating conditions comprising a separately excited field winding on said one generator, and a potentiometer, connections from said potentiometer to said separately excited field providing for varying and reversing the voltage of said winding, said motors being connected to the strip so that one motor drives the other and is braked by the regenerative effect produced by said other motor.

WILFRED B. GREEN.